United States Patent
Fischer et al.

[15] 3,647,341
[45] Mar. 7, 1972

[54] MOLD SYNCHRONIZING APPARATUS

[72] Inventors: Stefan Fischer, Im Korresgarten 21; Rainer Fischer, Am Wildtor 2, both of Lohmar, Germany

[22] Filed: Mar. 5, 1969

[21] Appl. No.: 804,566

[30] Foreign Application Priority Data

Mar. 7, 1968 Germany................P 17 04 067.4

[52] U.S. Cl..............................................425/326, 425/168
[51] Int. Cl.........................................................B29c 1/16
[58] Field of Search............18/5 BA, 5 BZ, 301, 2 TN, 5 BB; 25/41.2 B, 41.2 D; 164/327, 330; 74/109, 110

[56] References Cited

UNITED STATES PATENTS

| | | |
|---|---|---|
| 3,484,898 | 12/1969 | Cantarutti et al...............18/2 TN X |
| 847,858 | 3/1907 | Ware....................................74/110 |
| 2,453,656 | 9/1945 | Bullard..................................74/109 |
| 3,370,322 | 2/1968 | Nowicki...............................18/5 BB |

Primary Examiner—J. Spencer Overholser
Assistant Examiner—Norman E. Lehrer
Attorney—Burton L. Lilling

[57] ABSTRACT

The present invention relates to an apparatus for the production of hollow articles from thermoplastic synthetic plastic materials by the blowing method employing a two part mold which is opened and closed in the cyclic operation of the apparatus and which in turn is blown up in the mold to form the finished hollow article, and wherein the mold halves are coupled for synchronous movement with respect to one another.

2 Claims, 2 Drawing Figures

PATENTED MAR 7 1972 3,647,341

INVENTOR
STEFAN FISCHER
RAINER FISCHER
BY
ATTORNEY

MOLD SYNCHRONIZING APPARATUS

BACKGROUND OF THE INVENTION

The invention is primarily concerned with apparatus known as "beamless" machines and in which each mold half in its opening and closing movement is operated by a separate hydraulic or pneumatic control device.

In this type of apparatus, the tubular premolding is ordinarily formed with an extruder, the extrusion head of which is disposed in the receiving position of the mold approximately midway between the two mold halves. Thus, the tube is grasped simultaneously by both halves. However, in actual practice it is virtually impossible to achieve the object of having the two mold halves travel exactly the same distances within the unit of time alloted therefor. As a rule, lack of synchronism in the mold movement results, to a greater or lesser extent, in irregularities of the finished hollow article.

Previous attempts to obviate this situation have resulted in apparatus which produced a stop for the mold halves which prevented one mold half from moving towards the other mold half beyond the center position whereby the premolding would only be completely grasped upon the closing of the mold. However, this approach did not prevent the premolding from coming into contact with the mold half earlier than with the other and consequently caused cooling at the points of contact, prior to the final closing of the mold and before the inflation could be commenced.

SUMMARY OF THE INVENTION

It is, therefore, the primary object of the present invention to provide an apparatus for the production of hollow articles which eliminates the problems and difficulties encountered with prior art apparatus.

It is another object of the present invention to provide an apparatus as described above which includes a two part mold which is cyclically opened and closed and wherein the mold halves are moved independently of one another by means of separate hydraulic or pneumatic control devices and wherein means are provided for coupling the mold halves for synchronous movement with respect to one another.

The invention contemplates an apparatus of the aforementioned kind for the production of hollow articles from thermoplastic synthetic plastic materials having a two part mold which opens and closes in accordance with the cyclic operation of the apparatus and which receives a section of a tubular extruded premolding for blowing up into the finished hollow article. The mold halves of the apparatus are moved independently of one another by separate hydraulic or pneumatic control devices. With each mold half or an element moving in synchronism with the mold halves, for example the mold holding plates (platens) or the piston rod of the control cylinder and the like elements, there are connected coupling elements which transmit the movement imparted thereto directly or through intermediate devices to the coupling element of the other mold half and connect the two mold halves for drive with one another. The manner in which this is accomplished comprises examining the feed movements of the two mold halves by supervising elements which respond to deviations of synchronism and either accelerate or retard the forward movement of one mold half in dependence upon the amount of deviation. However, in many cases it is sufficient to provide a mechanical coupling device in one embodiment of the invention, which can be made in a simple manner wherein with each of the two mold holding plates, which move apart from and towards one another in the cyclic opening and closing of the mold halves, there are connected racks which transmit the movement imparted thereto through pinions to shafts which are coupled for driving engagement with one another through further pinions and a common rack.

This type of coupling device only permits a synchronous movement of the two mold holding plates or platens and, thus, excludes defects from being formed in the final products, which defects can occur by reason of irregular and nonsynchronous mold movement.

BRIEF DESCRIPTION OF DRAWINGS

These and other objects, features and advantages of the present invention will become more apparent when considered in conjunction with the detailed description hereinafter together with the accompanying drawings wherein.

Figure 1:
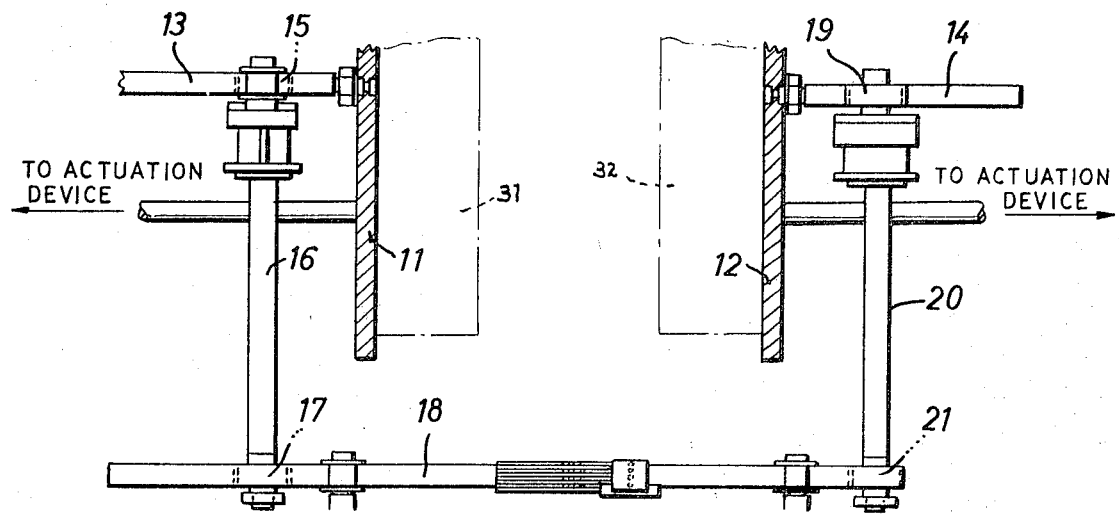
FIG. 1 is an elevational view of the preferred embodiment of the mold synchronizing apparatus constructed in accordance with principles of the present invention.

Referring now to the drawing, the two mold holding plates are designated 11 and 12 and have mold halves 31 and 32, respectively secured thereon. Each of the two mold holding plates is carried and moved by the piston or the platon rod of a pressure cylinder, generally indicated as an actuation device, in a known manner, so that a particular representation of these parts is superfluous. The mold holding plates 11 and 12 are rigidly connected for driving engagement with one another through a mechanical coupling apparatus.

The coupling apparatus comprises a rack 13 and a rack 14 connected with the mold holding plates 11 and 12, respectively. The rack 13 is in engagement with a pinion 15 which is mounted on a shaft 16. At the other end of the shaft 16, there is provided another pinion 17 which engages another rack 18.

The rack 14 which is connected with the mold holding plate 12 drives a pinion 19 disposed on the shaft 20, on the other end of which is mounted another pinion 21 which also engages the rack 18. The shafts 16 and 20 are disposed in parallel alignment.

In this manner, the shafts 16 and 20 are rigidly connected in driving engagement with one another by means of the rack 18.

Figure 2:
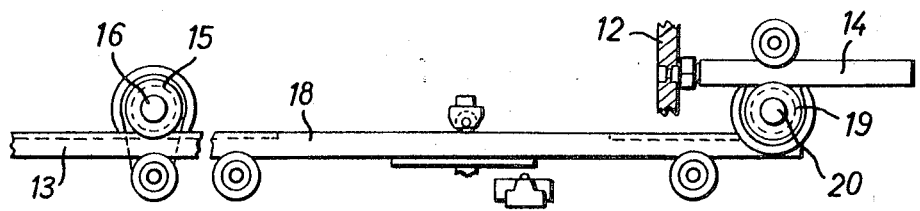
FIG. 2 is a top plan view of mold synchronizing apparatus depicted in FIG. 1.

Thus, in the operation of the apparatus, movement of the mold holding plate 11 to the right, as viewed in FIG. 1, by means of the actuation device connected to the mold holding plate will concomitantly therewith cause the rack 13 to move to the right, as viewed in FIGS. 1 and 2. The movement of rack 13 to the right will cause pinion 15, and thus shaft 16 to which it is secured, to rotate in a counterclockwise direction. The counterclockwise rotation of shaft 16 will cause a corresponding rotation of pinion 17 secured thereto and will cause pinion 17 which is in engagement with rack 18 to move rack 18 towards the right, as viewed in FIGS. 1 and 2.

It is herein to be noted that the shafts 16 and 20 are fixed in position and are only capable of rotational movement about their center axes.

When the rack 18 moves to the right, it causes counterclockwise rotation of pinion 21 which is transmitted to pinion 19 via shaft 20 to cause a corresponding rotation of pinion 19. This counterclockwise rotation of pinion 19 will cause the rack 14, and thus mold holding plate 12, to move to the left, as viewed in FIG. 1.

Thus, any movement of mold holding plate 11 towards the center position, midway between the mold holding plates 11 and 12, is accompanied by a corresponding movement of the mold holding plate 12 towards the center position. It will be apparent that due to the intercoupling of the plates 11 and 12 by the coupling apparatus hereinabove described, that the aforesaid description is equally applicable to dependent movement of the mold holding plate 11 upon initial movement of the mold holding plate 12. Thus, if both the plates 11 and 12 are moving in dependence upon the force imparted thereto by the respective actuation devices to which they are connected, their movement is dependent upon one another and is thereby synchronized, whereby the plates 11 and 12 will travel an equal distance toward the center position therebetween from their outermost positions.

It will be appreciated that the synchronized operation of the mold holding plates 11 and 12 enable the two mold halves 31 and 32 to be joined precisely where desired and thus produce a finished hollow article which does not have any irregularities.

It will thus be seen that due to the arrangement of the coupling apparatus of the present invention, the molding plates move in the same manner, i.e., a closing movement of one of the plates is converted into a closing movement of the other of the plates and an opening movement of one of the plates is converted into an opening movement of the other of the plates.

It is also to be noted that although the present invention has hereinabove been described with reference to each of the molding plates being connected to an actuation device to effect the opening and closing movement thereof, it is equally possible, and within the contemplation of the present invention, to have only one of the molding plates directly connected to an actuation device, whereby the other plate moves in dependence upon the movement of the first mentioned plate. In this arrangement, the cyclic response of the system would, of course, be slower than that where two separate actuation devices are employed.

Thus, while we have shown and described the preferred embodiments of our invention, there are many other modifications, changes and improvements which may be made therein without departing from the spirit and scope thereof as defined in the appended claims.

What is claimed is:

1. A molding device having mold halves adapted to synchronously open and close, said device comprising first and second holding plates having said mold halves secured thereto and having rack means extending therefrom, at least one actuating means connected to either said first or second mold holding plates, first and second rotational coupling means cooperatively associated with said rack means extending from said first and second mold holding plates, and said first and second coupling means cooperatively associated with a rigid translational connecting means interconnecting said first and second coupling means whereby the opening and closing movement of said mold holding plates with respect to one another is synchronized, said first and second rotational coupling means each comprising a shaft, and first and second pinions, said first pinions being operatively connected between said shafts and said racks, said connecting means comprising a common rack, said second pinions being operatively connected between said shafts and said common rack, said actuation means being connected to one of said mold holding plates so as to impart a movement to said plate and to said other mold holding plate and to said first mentioned racks, said movement of said racks via said actuation means being transmitted through said pinions, said shafts and said common rack to the other of said first mentioned racks to cause corresponding movement of the other of said first mentioned racks in dependence upon the movement of said one of said first mentioned racks.

2. A device in accordance with claim 1, wherein said shafts are disposed in fixed parallel alignment and are adapted for rotational movement about the center axes thereof in dependence upon the movement imparted thereto by means of the pinions which are fixedly secured thereto.

* * * * *